United States Patent [19]

Bruegge et al.

[11] Patent Number: 4,681,696

[45] Date of Patent: Jul. 21, 1987

[54] SOLID STABILIZED ACTIVE HALOGEN-CONTAINING DETERGENT COMPOSITIONS AND METHODS

[75] Inventors: Anthony J. Bruegge, Cincinnati; Denny E. Daughtery, West Chester, both of Ohio

[73] Assignee: Chemed Corporation, Cincinnati, Ohio

[21] Appl. No.: 821,405

[22] Filed: Jan. 22, 1986

Related U.S. Application Data

[63] Continuation-in-part of Ser. No. 622,199, Jun. 19, 1984, abandoned.

[51] Int. Cl.[4] .......................... C11D 3/10; C11D 7/56; C01B 11/06

[52] U.S. Cl. .......................................... 252/99; 252/95; 252/102; 252/186.34; 252/186.35; 252/186.36; 252/186.37; 252/187.26; 252/187.33; 252/187.34

[58] Field of Search ...................... 252/186.34, 186.35, 252/186.36, 186.37, 95, 99, 102

[56] References Cited

U.S. PATENT DOCUMENTS

| | | | |
|---|---|---|---|
| 2,913,460 | 11/1959 | Brown et al. | 252/99 |
| 2,957,915 | 10/1960 | Kokorudz | 252/186.36 |
| 2,980,622 | 4/1961 | Symes | 252/99 |
| 3,002,931 | 10/1961 | Symes | 252/99 |
| 3,008,903 | 11/1961 | Habernickel et al. | 252/186.38 |
| 3,054,753 | 9/1962 | Hurt et al. | 252/99 |
| 3,096,291 | 7/1963 | Schauer et al. | 252/99 |
| 3,108,969 | 10/1963 | Symes | 252/99 |
| 3,112,274 | 11/1963 | Morgenthaler et al. | 252/186.35 |
| 3,247,118 | 4/1966 | Matthaei | 252/99 |
| 3,354,090 | 11/1967 | Keast | 252/99 |
| 3,749,672 | 7/1973 | Golton et al. | 252/95 |
| 3,761,416 | 9/1973 | Stahlheber | 252/99 |

*Primary Examiner*—Prince E. Willis
*Attorney, Agent, or Firm*—Wood, Herron & Evans

[57] ABSTRACT

A detergent composition containing a stabilized active halogen source is disclosed. An active halogen source, such as a hypochlorite, in aqueous solution, is stabilized by combining it with known anhydrous or partially anhydrous builders, as well as fillers, defoamers, polyelectrolytes, and hydroxides to form a solid detergent composition. The aqueous solution of the active halogen source is first combined with at least one sulfonamide. The destaining activity of the halogen remains effective even after a prolonged storage period.

9 Claims, 3 Drawing Figures

BLEACHING STUDY (% REFLECTANCE)

STABILITY AT 27°C (80°F)

SOLID STABILIZED ACTIVE HALOGEN-CONTAINING DETERGENT COMPOSITIONS AND METHODS

RELATED APPLICATION

This is a continuation in part of application Ser. No. 622,199 filed June 19, 1984, now abandoned.

BACKGROUND OF THE INVENTION

A common component of detergent compositions is a bleaching compound which yields active halogen ions, e.g., $Cl^+$ or $Br^{30}$, in water. Some of the active halogen sources commonly used in detergent compositions are sodium hypochlorite, calcium hypochlorite, lithium hypochlorite, chlorinated trisodium phosphate, and organic compositions such as 1,3-dichloro-5,5-dimethyhydantoin, chlorobromohydantoin, trichloroisocyanuric acid, and dihaloisocyanuric acids and their salts; others are known in the art.

In addition to the active halogen or bleaching component, detergent compositions are generally alkaline and include one or more additional detergent components, such as alkaline agents, caustic alkaline builders, compounds for sequestering and suspending hard water ions either as inorganic phosphates or polyorganic polyelectrolytes, or both, and defoamers, as well as others.

Incorporation of a source of active halogen ion into a highly alkaline system with or without a defoamer generally causes a degradation or loss of the available halogen. Degradation of available halogen is temperature-dependent and tends to occur, for example, as $$2NaOCl \rightarrow 2NaCl + O_2$$

This change not only gradually renders the compound increasingly ineffectve with respect to bleaching, but also could potentially cause product expansion. As the oxygen gas is generated by the decomposition, it will diffuse through the system to release into the atmosphere.

The use of N-sodium-N-chloro-para toluenesulfonamide, i.e., referred to hereinafter as Chloramine-T, as the source of available chlorine for bleaching and sanitizing is known to provide shelf stability. The bleaching ability of this compound, however, is somewhat limited because the chlorine is made available by the hydrolysis of Chloramine-T, which has a dissociation constant of only $4.9 \times 10^{-8}$. In the detergent industry, Chloramine-T is considered a source of active halogen. However, due to Chloramine-T's low dissociation constant, it is not an efficient source of chlorine. In effect, it provides little bleaching activity.

Hypochlorites are known to be unstable in the presence of free water. Hunt et al U.S. Pat. No. 3,054,753 discloses that incorporation of certain aromatic sulfonamides in a powder detergent, which has a dry organic hypochlorite, stabilizes the hypochlorite. Hunt et al more specifically discloses the dry blending of the detergent components together with the hypochlorite and aromatic sulfonamide. However, it has been found that the dry blending of a sulfonamide with a dry hypochlorite containing detergent does not provide any stabilization.

Symmes U.S. Pat. No. 3,002,931 discloses incorporation of a dry sulfonamide with a dry detergent to provide chlorine stability. Symmes also discloses the subsequent addition of water to form a slurry. The sulfonamide when combined in dry form provides little if any actual chlorine stability. Subsequent formation of a slurry does provide some chlorine stability but not sufficient stability to withstand the high storage temperature frequently encountered with detergents. It is noteworthy that the Symmes patent does not disclose that formation of a slurry provides storage stability. Apparently this advantage was totally unappreciated.

Symmes further states that the slurries can be spray dried or dried by drum drying. Such drying does not enhance the chlorine stability of the dry product and in fact should drive off most of the available chlorine.

Thus, there exists a need for a more storage stable solid detergent which includes an efficient source of active halogen. For use in mechanical ware-washing machines, a balanced formulation is required where the halogen source is present in a reactive, readily available form. The composition should have a self life of several months, even at the high temperatures encountered in a warehouse in summer.

SUMMARY OF THE INVENTION

In the present invention, an active and efficient halogen source is stabilized by mixing it in the presence of free water, sufficient hydratable (anhydrous) detergent builders such as anhydrous inorganic phosphates or silicates, to react with the active water and to convert the mixture to a solid form. Stability is preferably further improved by adding one or more organic water-soluble sulfonamides to the halogen source and in the presence of free water, prior to incorporating the detegent builders. The sulfonamide improves the stability of the detergent and permits the detergent to be formulated as a stable solid. Further, the sulfonamide improves the stability of the detergent at higher temperatures.

The active halogen in these solid or slurried detergents is storage stable and is particularly suitable for use in high performance applications such as automatic ware-washing machines. The detergents are easily dissolved and/or dispensed by an automatic washing machine.

These and other features of the present invention will be appreciated in light of the following detailed description and drawings, in which:

DETAILED DESCRIPTION

Figure 1:
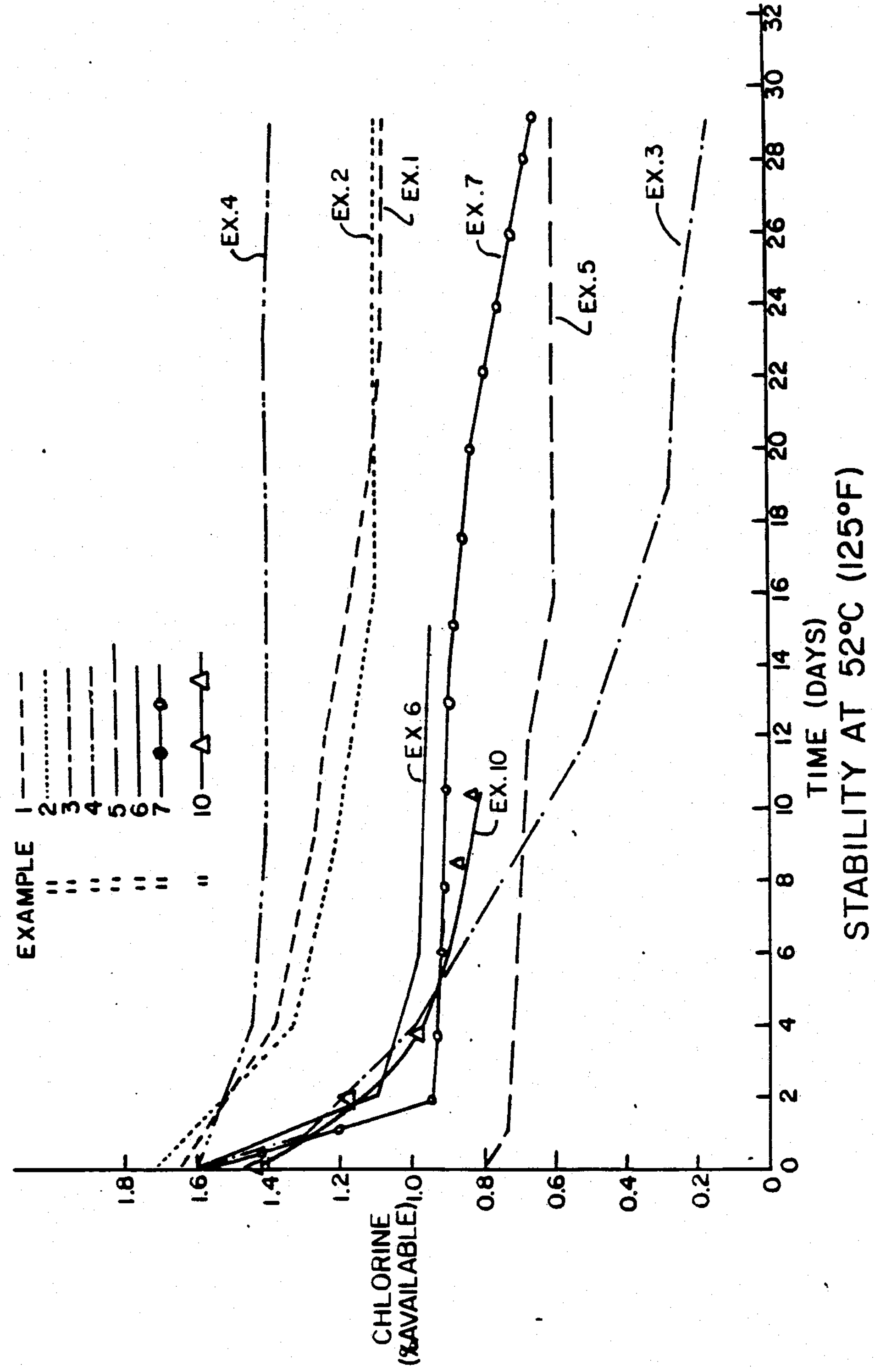
FIG. 1 is a graph comparing the time stabilities of various chlorine-containing detergents at 52° C. (125° F.)

The active halogen generating compounds which can be stabilized by the present invention are hypochlorite-generating compounds or hypobromite-generating compounds suitable for use in detergent compositions. These compositions must be water-soluble and generate an active halogen ion (i.e., $Cl^+$ or $Br^+$) upon dissolution in water. Examples of some specific active halogen generating compounds include chlorinated isocyanuric acids and their salts such as trichlorocyanuric acid, dichlorocyanuric acid, sodium dichloroisocyanurate and potassium dichloroisocyanurate. Additional suitable halogen sources are the hydantoins such as 1,3-dichloro 5,5-dimethylhydantoin, N-monochloro-C,C-dimethylhydantoin, methylenebis(N-chloro-C,C-dimethylhydantoin), 1,3-dichloro-5-methyl-5-isobutylhydantoin, 1,3-dichloro-5-methyl-5-ethylhydantoin, 1,3-dichloro-5-methyl-5-N-amylhydantoin, chloro bromo hydantoin, and the like. Other useful hypochlorite liberating agents are water-soluble inorganic salts such as lithium hypochlorite, calcium hypochlorite, sodium hypochlorite and chlorinated trisodium phosphate.

The halogen source must also be an efficient halogen source. An efficient halogen source is one which provides effective or efficient bleaching activity in use. Chloramine-T and di-chloramine-T are not efficient halogen sources because they do not provide any substantial bleaching activity. Accordingly, hereinafter the term efficient halogen source specifically excludes Chloramine-T and Di-chloramine-T.

An aqueous solution of active efficient halogen is prepared with a desired level of available halogen, for example, 0.5–2% available halogen. This aqueous solution is stabilized by adding sufficient hydratable (anhydrous or partially hydrated) detergent builders to form a solid detergent. Hydratable detergent builders are well known and generally include any detergent builder which reacts with water to form a hydrated form of the detergent builder. Particularly suitable hydratable detergent builders include inorganic anhydrous phosphates, anhydrous carbonates, caustic soda, anhydrous silicates, anhydrous sulfates, and anhydrous borates. More specifically, these include trisodium phosphate, anhydrous, trisodium phosphate monohydrate, sodium tripolyphosphate, tetra sodium pyrophosphate, tetra potassium pyrophosphate, sodium carbonate anhydrous and partially hydrated forms, borax, trisodium phosphate hemihydrate, trisodium phosphate hexahydrate, trisodium phosphate octahydrate, disodium phosphate anhydrous and all partially hydrated structures, i.e., dihydrate, heptahydrate, octahydrate, tripotassium phosphate anhydrous, tripotassium phosphate trihydrate, tripotassium phosphate heptahydrate, and potassium tripolyphosphate.

Stabilization is achieved simply by mixing the hydratable detergent builders with the aqueous active efficient halogen-containing solution. Water is chemically removed by hydration of the detergent components. The hydration reaction is exothermic. Cooling is preferred (i.e., to 38° C.), but is not essential. The hydratable builders, upon reacting with the water, form a solid detergent in which the active chlorine is uniformly dispersed throughout the detergent. The amount of hydratable builders should be sufficient to bind substantially all of the free water (i.e., form a solid). This amount will, of course, vary depending on the particular hydratable components added.

To achieve the best stability at higher temperatures, such as those encountered under storage conditions, and more specifically, at temperatures exceeding about 52° C. for a substantial period, it is preferred to incorporate a sulfonamide in the composition. Suitable sulfonamides for use in the present invention include alkyl and aromatic water soluble sulfonamdies. More particularly, the suitable sulfonamides include substituted and unsubstituted alkyl sulfonamides, substituted and unsubstituted aryl sulfonamides and substituted and unsubstituted alkaryl sulfonamides. Preferred sulfonamides include phenol sulfonamide and halogenated phenol sulfonamide. P-toluene sulfonamide and N-sodium-N-chloro-p-toluene sulfonamide (Chloramine-T) are particularly suited for use in the present invention.

For use in the present invention, the sulfonamide must includes a sulfonamide group or radical having the following formula:

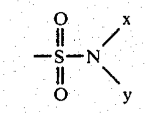

wherein x and y represent a member selected from the group consisting essentially of hydrogen, an alkali or alkaline earth metal ion, halogen, $C_1$–$C_5$ and alkyl radical and wherein at least one of x and y must be hydrogen or a metal ion. When x or y is hydrogen or a metal ion, it is a reactive site on the sulfonamide. Chloramine-T has a sulfonamide group having the following formula:

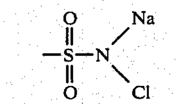

Accordingly, chloramine-T has only one reactive site on the sulfonamide. Di-chloramine-T has a sulfonamide group having the following formula:

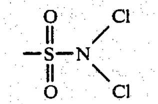

Accordingly, di-chloramine-T has no reactive sites on the sulfonamide group and is unsuitable for use in the present invention.

The aqueous solution of active halogen source and sulfonamide are first combined at temperatures ranging from room temperature (generally about 17° C.) to about 87° C. If dry sulfonamide were added to a dry detergent, i.e., when no free water is present, no stabilization is provided. The stabilization reaction between the sulfonamide and active halogen is a one to one reaction, i.e., one mole of active efficient halogen ion is stabilized by each reactive sulfonamide site. Therefore, two moles of active efficient halogen are stabilized by one mole of p-toluene sulfonamide. Only one mole of active efficient halogen is stabilized by the addition of one mole of Chloramine-T.

This solution is then stabilized by adding anhydrous detergent builders in sufficient quantities to form a solid detergent as previously discussed.

Other suitable detergent components can also be included in the detergent of the present invention, such as alkaline builders, sequestrants, polymers, surfactants and fillers.

The detergent composition of the present invention may contain well known organic or inorganic builder salts, for example, tetrasodium and tetrapotassium pyrophosphate, pentasodium and pentapotassium tripolyphosphate, sodium or potassium carbonate, sodium or potassium silicates, hydrated or anhydrous borax, sodium or potassium sesquicarbonate and zeolites.

The present invention may also include surfactants including non-ionic, anionic and zwitterionic surfactants.

The detergent composition of the present invention can further include fillers such as alkali metal sulfates, chlorides, carbonates, sesquicarbonates and other inert ingredients well known to the art.

Preferred approximate ranges of components include:

(1) 0.5 to 7% at least one sulfonamide, (2) 0.4 to 2.5% hypochlorite or other active halogen-containing compound, (3) 25 to 65% water, (4) 5 to 40% anhydrous phosphate, (5) 0 to 25% anhydrous silicate, (6) 0 to 10% polyelectrolyte, (7) 0 to 35% sodium carbonate, and (8) 0 to 5% defoamer, (9) 0 to 5% surfactant.

The present invention can be further appreciated by reference to the following examples.

EXAMPLE 1

A detergent was formulated having the following components:

| | | |
|---|---|---|
| Water | 33.4% | |
| NaOCl | 11.8% | (13.5% solution) |
| p-toluene sulfonamide | 1.9% | |
| Trisodium phosphate (anhydrous) | 8.84% | |
| Sodium tripolyphosphate (anhydrous) | 11.0% | |
| Soda ash | 21.06% | |
| Sodium metasilicate (anhydrous) | 11.0% | |
| Sodium polyacrylate | 1.0% | (20% solution) |
| | 100.00 | |

Figure 2:
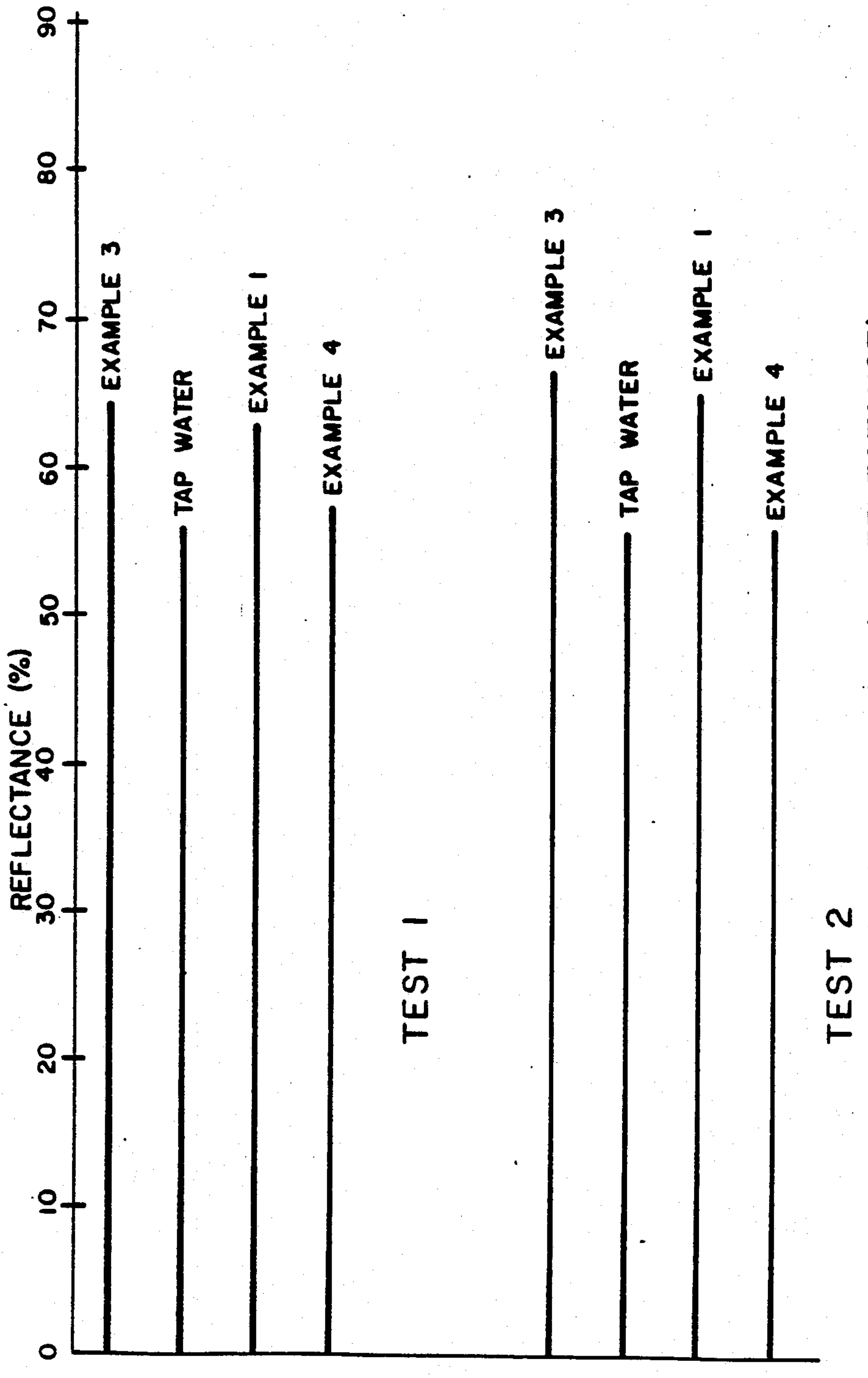
FIG. 2 is a graph comparing the relative bleaching efficiency of various chlorine-containing compositions.

The detergent was formulated by mixing the sulfonamide, NaOCl and water to form an aqueous solution. The remaining components were then added with mixing. A solid detergent was formed. This is a working example of the present invention using p-toluene sulfonamide as the sulfonamide. This was tested for stability and bleaching efficiency. The results are shown in FIGS. 1 and 2.

EXAMPLE 2

A detergent was formulated having the following components:

| | | |
|---|---|---|
| Water | 37.3% | |
| NaOCl | 6.6% | (13.5% solution) |
| Chloramine-T | 3.0% | |
| Na tripoly phosphate (anhydrous) | 8.84% | |
| Tri sodium phosphate (anhydrous) | 11.0% | |
| Soda ash | 21.06% | |
| Na Polyacrylate | 1.2% | (20% solution) |
| Sodium Metasilicate (anhydrous) | 11.0% | |
| | 100.00 | |

The detergent was formulated by mixing the sulfonamide (Chloramine-T) NaOCl and water to form an aqueous solution. The remaining components were then mixed into the aqueous solution. This mixture set to form a solid detergent. The stability of this detergent is shown in FIG. 1.

EXAMPLE 3

A detergent was formulated from the following components:

| | | |
|---|---|---|
| Water | 34.7% | |
| Tri sodium phosphate (anhydrous) | 8.84% | |
| Sodium tripolyphosphate (anhydrous) | 11.0% | |
| NaOCl | 12.4% | (13.5% solution) |
| Soda ash | 21.06% | |
| Sodium metasilicate | 11.0% | |
| Polyacrylate | 1.0% | (20% solution) |
| | 100.00 | |

The NaOCl and water were combined and the remaining components were then mixed into this aqueous solution. This mixture set forming a solid detergent. This is a working example of the embodiment of the present invention wherein the sulfonamide is not included. This composition was tested for stability at 52° C. and at 27° C. and the results are again shown in FIGS. 1 and 3.

EXAMPLE 4

A detergent composition was formulated from the following components:

| | | |
|---|---|---|
| Water | 41.0% | |
| Tri sodium phosphate (anhydrous) | 8.84% | |
| Sodium tripolyphosphate | 11.0% | |
| Soda ash | 21.06% | |
| Sodium metasilicate (anhydrous) | 11.0% | |
| Na Polyacrylate | 1.0% | (20% solution) |
| Chloramine-T | 6.1% | |
| | 100.00 | |

The detergent was formulated by combining the chloramine-T and water. No efficient chlorine source was added. The remaining components were mixed into this aqueous solution and the mixture set. This example is presented to show the stability and bleaching efficiency of chloramine-T. The results are shown in FIGS. 1 and 2.

EXAMPLE 5

A detergent was formulated with the following detergent components:

| | | |
|---|---|---|
| Water | 44.0% | |
| Tri sodium phosphate (anhydrous) | 8.84% | |
| Sodium tripolyphosphate (anhydrous) | 11.0% | |
| Soda ash | 21.06% | |
| Sodium metasilicate (anhydrous) | 11.0% | |
| Polyacrylate | 1.0% | (20% solution) |
| Chloramine-T | 3.1% | |
| | 100.00 | |

The detergent was formulated by combining the chloramine-T and water to form an aqueous solution. The remaining components were then added to this solution to form a mixture which set and formed a solid detergent. The stability of this detergent is shown in FIG. 1. This example demonstrates the stability of a 3.1% Chloramine-T detergent and is shown only for comparison with Example 7 which also includes approximately the same amount of Chloramine-T.

EXAMPLE 6

A detergent was formulated with the following components:

| | | |
|---|---|---|
| Water | 34.1% | |
| NaOCl | 11.8% | (13.5% solution) |
| Tri sodium phosphate (anhydrous) | 8.84% | |
| Sodium tripolyphosphate (anhydrous) | 11.0% | |
| Soda ash | 21.06% | |
| P-toluene sulfonamide | 1.2% | |
| Sodium metasilicate (anhydrous) | 11.0% | |
| Polyacrylate | 1.0% | (20% solution) |
| | 100.00 | |

The detergent was formed by combining the water NaOCl and sulfonamide to form an aqueous solution. The remaining components were then mixed into this solution to form a mixture which set to form a solid detergent. This detergent has a lower ratio of sulfonamide to active efficient chlorine. The stability of this detergent is shown in FIG. 1. This example demonstrates the effect of the sulfonamide to chlorine ratio on the overall stability of the detergent.

EXAMPLE 7

A detergent was formulated from the following components:

| | | |
|---|---|---|
| Water | 37.5% | |
| NaOCl | 6.53% | (13.5% solution) |
| Tri sodium phosphate (anhydrous) | 8.84% | |
| Sodium tripolyphosphate (anhydrous) | 11.0% | |
| Soda ash | 21.06% | |
| Sodium metasilicate (anhydrous) | 11.0% | |
| Polyacrylate | 1.0% | (20% solution) |
| Chloramine-T | 3.07% | |
| | 100.00 | |

The detergent was formed by combining the water and NaOCl to form an aqueous solution. All of the remaining components except the Chloramine-T were mixed into this aqueous solution. The mixture set forming a solid mass. The solid mass was flaked and mixed in a dry state with chloramine-T. This example follows in part the teaching of U.S. Pat. No. 3,054,753. As seen in FIG. 1, this example demonstrates that adding Chloramine-T in a dry state does not improve the stability of the chlorine.

FIGS. 1 and 2 show data obtained testing various of these detergents with respect to stability and bleaching efficiency. FIG. 1 shows the amount of chlorine present versus time. The available chlorine was measured by titration. The data depicted in FIG. 1 demonstrates that Examples 1 and 2, which are a practice of the preferred embodiment of the present invention, exhibit superior stability at elevated temperatures. Example 3 is a demonstration of a less preferred embodiment of the present invention wherein an aqueous solution of a chlorine source is combined with hydratable detergent components and builders to form a self-solidifying mass. Although this method provides substantial stability at moderate temperatures (see FIG. 3), the stability is extremely temperature dependent. At elevated temperatures, such as those tested, i.e., 52° C., stability is substantially reduced.

The most stable detergent was that made according to Example 4 wherein the only chlorine source was chloramine-T. This detergent has high levels of titratable chlorine. However, as will be shown with the results depicted in FIG. 2, the chlorine source, although identifiable by titration, is not an efficient chlorine source.

Example 6 is presented to demonstrate the stoichiometric relationship of sulfonamide to active chlorine source. The molar ratio of sulfonamide to active chlorine source should preferably be at least 0.5 if the sulfonamide has two reactive sites and 1 if the sulfonamide has only one reactive site. In Example 6, the sulfonamide was paratoluene sulfonamide having two reactive sites. According to the present invention, the molar ratio should have been 0.5. In Example 6, the molar ratio was 0.33. A reduction in stability was demonstrated compared to Examples 1 and 2. Examples 5 and 7 are used to compare the present invention to the prior art. Example 7 demonstrates that chloramine-T, when added to a dry detergent, does not improve the stability of the chlorine source. In Example 7, the detergent was formulated without Chloramine-T to form a solid. The solid was then flaked and combined with chloramine-T as a dry mixture. There is a substantial amount of titratable chlorine. However, a comparison with Example 5 demonstrates that the available titratable chlorine is from the chloramine-T and the sodium hypochlorite has not been stabilized. Example 5, of course, is a detrgent formulated in the same manner as Example 4 with the exception that the chloramine-T was only 3.0% which is approximately the same amount of chloramine-T used in the formulation of Example 7. Accordingly, when mixing the chloramine-T with a dry detergent, little, if any, sabilization is observed.

The data shown in FIG. 2 was obtained as follows: A white cloth, composition 50/50 polyester cotton, was totally immersed in a four liter solution containing 24 grams of soluble tea for three minutes. The cloth was rinsed in de-ionized water and dried with a heat gun. The same procedure was repeated with 20 hours elapsed between the repetition to create a double stained cloth. (The artificially stained cloth was chosen as the substrate as opposed to stained ceramic because of the reliability and reproduceability of the test method. This method allowed for better distinction between the individual chlorine sources.) The cloths were then cut into two by two inch squares.

As shown in FIG. 2, the detergents prepared in Examples 1, 3 and 4 were tested. In test 1, these detergents were used to prepare 0.3% stock solutions wth 8 grains hard water and heated to 160° F. The tea-stained cloths were then added to the solution for one minute, removed, rinsed with 8 grain water, and air dried. A blank was also run whch was tap water only 8 grain at 160° F. In test 2, this same procedure was followed again with an exposure time of two minutes.

The samples were compared using a photovoltaic reflectormeter using the suppressed 0 method and magnesium carbonate as 97% of absolute reflectance. Using this suppressed 0 method, the unstained white polyester/cotton cloth was set at 100 on the galvanometer, and the stained cloth was set at 0. The dried, treated samples were then measured for reflectance. The reading obtained was then used to determine absolute reflectance Rx with the equation $Rx=rd+(Gx/100)(Re-Rd)$ where Re is reflectance of white cloth, Rd is reflectance of stained cloth, and Gx is galvanometer reading. The results are graphically displayed in FIG. 2.

There is essentially no difference in reflectance between tap water and the product containing chloramine-T (Example 4). Therefore, no efficient bleaching is apparent. However, the sample with the blended sulfonamide and hypochlorite produces a reflective value which is in excess of 85% of the product containing all sodium hypochlorite. Thus, this invention provides a product with bleaching ability nearly equivalent to a product formulation having all its chlorine as sodium hypochlorite and with superior stability. The apparent distinction between these two mixes is the stabilized yet reactive available chlorine in the aforementioned invention compared with the reactive yet less stable compound containing all the available chlorine in an inorganic hypochlorite.

EXAMPLE 8

To evaluate the stabilization effect of forming a solid detergent formed without the addition of a sulfonamide (as in Example 3), a comparative detergent solution was formed from the following components:

| | |
|---|---|
| $H_2O$ | 19.9 |
| Trisodium phosphate | 8.84 |
| Potassium Hydroxide (46%) | 15.00 |
| Sodium polyacrylate | 0.2 |
| Soda Ash | 35.06 |
| NaOCl (13.5%) | 10.00 |
| Sodium Tripolyphosphate | 11.00 |
| | 100.00 |

Figure 3:
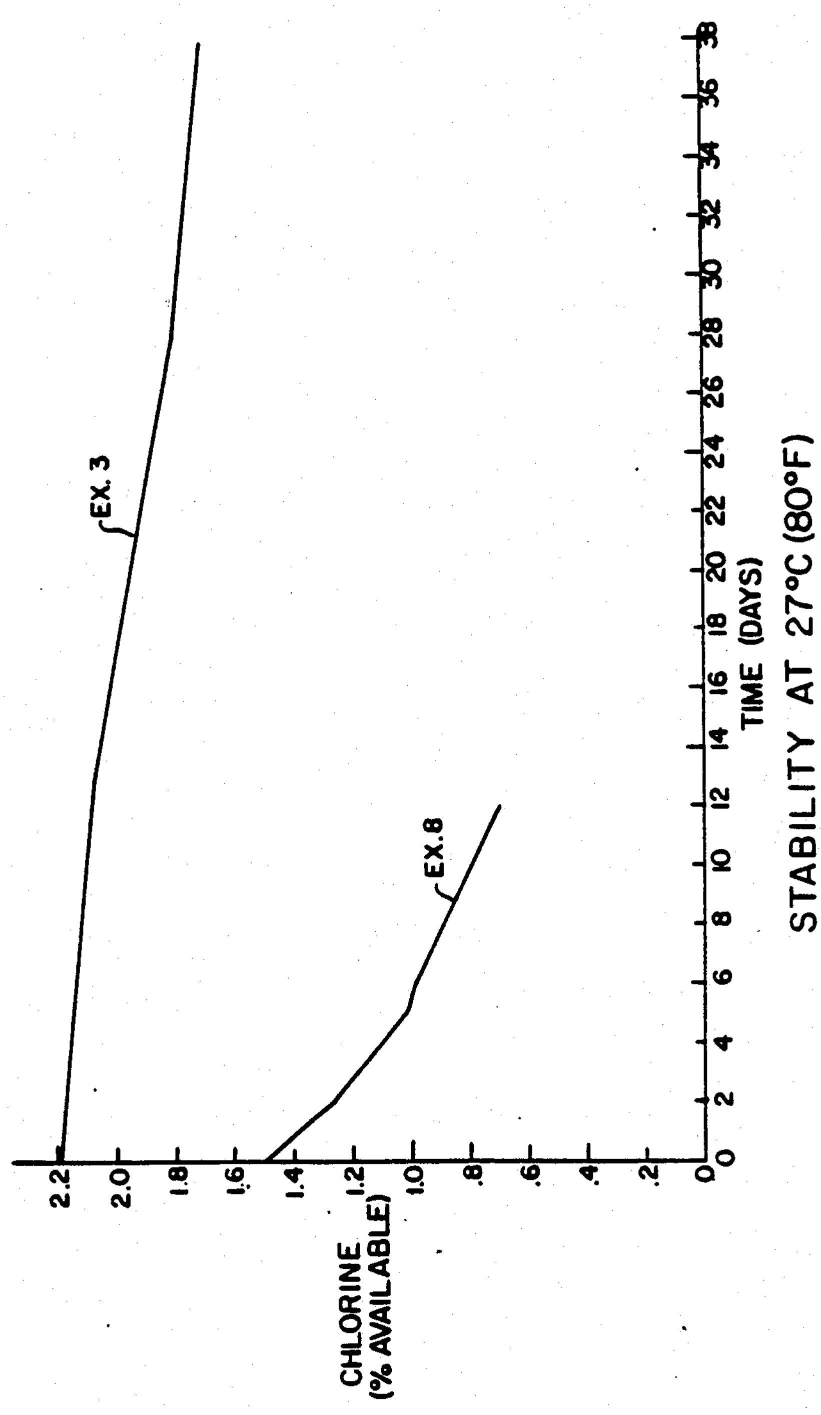
FIG. 3 is a graph comparing the time stabilities of a solid and a slurried detergent.

This formed a liquid suspension. The suspension was compared to the detergent composition formed according to Example 3 which was a solid formed without any sulfonamide. The results of the comparison are shown in FIG. 3. This comparison clearly indicates that the solidification of the hypochlorite solution by the addition of hydratable detergent components acts to stabilize the chlorine content when stored at lower temperatures.

EXAMPLE 9 (Comparative Example)

A slurried detergent was formulated from the following components:

| | |
|---|---|
| Water | 40.5 |
| Sodium Hypochlorite (13.5 Solution) | 10.3 |
| p-toluene Sulfonamide | 1.7 |
| Sodium Silicate (anhydrous) | 17.7 |
| Sodium Hydroxide | 13.0 |
| Sodium Carbonate (anhydrous) | 4.0 |
| Sodium Tripolyphosphate (anhydrous) | 12.0 |
| Sodium Polyacrylate | 0.8 |
| | 100.0 |

The detergent was formulated by combining the water, NaOCl and p-toluene sulfonamide. This formed an aqueous solution. The remaining components listed above were added to this solution to form a viscous flowable slurry. The slurry exhibited improved chlorine stability. But this detergent exhibited substantially lower chlorine stability than the solid detergent incorporating the sulfonamide.

EXAMPLE 10 (Comparative Example)

A slurried detergent was formulated from the following components:

| | |
|---|---|
| Water | 44.55 |
| Sodium Hypochlorite (13.0 Soln) | 5.2 |
| Chloramine-T | 2.75 |
| Sodium Silicate (anhydrous) | 17.7 |
| Sodium Hydroxide | 13.0 |
| Sodium Carbonate (anhydrous) | 4.0 |
| Sodium Tripolyphosphate (anhydrous) | 12.0 |
| Sodium Polyacrylate | 0.8 |

The detergent was formulated by combining the water, NaOCl and chloramine-T. This formed an aqueous solution. The remaining components listed above were added to this solution to form a viscous flowable slurry. The slurry demonstates improved chlorine stability, but was not as stable as a solid detergent of similar formulation. This can be seen by reference to FIG. 1.

EXAMPLE 11

A solid detergent was formed from the following components:

| | |
|---|---|
| Water | 35.4 |
| Trisodium Phosphate (anhydrous) | 6.0 |
| Sodium Hydroxide | 18.0 |
| Sodium Polyacrylate | 1.0 |
| Chloramine-T | 3.0 |
| Sodium Hypochlorite (13.5 Solution) | 6.6 |
| Sodium Carbonate (anhydrous) | 18.0 |
| Sodium Tripolyphosphate (anhydrous) | 12.0 |

The detegent was formulated by combining the water chloramine-T and NaOCl to form an aqueous solution. The remaining components were mixed into the solution. The solution set to form a solid detergent which exhibited excellent chlorine stability.

EXAMPLE 12

| | |
|---|---|
| Water | 24.32 |
| Trisodium Phosphate (anhydrous) | 4.00 |
| Sodium Hydroxide | 9.68 |
| Sodium Tripolyphosphate | 11.00 |
| Sodium Carbonate (anhydrous) | 21.00 |
| Sodium Metasilicate (anhydrous) | 11.00 |
| Sodium Polyacrylate | 1.00 |
| Sodium Hypochlorite (13.5% Solution) | 18.00 |

The detergent was formulated by combining the water and NaOCl to form an aqueous solution. The remaining components were mixed into the solution. The solution set to form a solid detergent which exhibited excellent stability at moderate temperatures even in the absence of a sulfonamide.

EXAMPLE 13

| | |
|---|---|
| Water | 29.1 |
| Trisodium Phosphate (anhydrous) | 8.84 |
| Sodium Tripolyphosphate (anhydrous) | 11.00 |
| Sodium Carbonate (anhydrous) | 25.06 |
| Sodium Metasilicate (anhydrous) | 15.00 |
| Sodium Polyacrylate | 1.00 |

-continued

| | |
|---|---|
| Sodium Hypochlorite (13.5 solution) | 10.00 |

The detergent was formulated by combining the water and NaOCl to form an aqueous solution. The remaining components were mixed into the solution. The solution set to form a solid detergent which exhibited excellent chlorine stability.

These examples demonstrate that the present invention provides a stable, efficient halogen-containing detergent. Further, these examples demonstrate that the prior art fails to solve the problem of chlorine stability.

Accordingly, in light of the preceding disclosure and advantages of the present invention, we claim:

1. A method of stabilizing an active efficient halogen source selected from the group consisting of water soluble hypochlorites, halogenated hydantoins, halogenated phosphates, chlorinated isocyanuric acids and salts thereof, comprising mixing free water, one or more sulfonamides selected from the group consisting of water soluble alkyl sulfonamides and water soluble aryl sulfonamides and an active efficient halogen source to form a solution of sulfonamide and halogen source and combining said solution with one or more hydratable detergent builders in an amount effective to form solid detergent, wherein said sulfonamide includes a sulfonamide radical defined by the following formula:

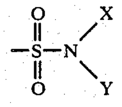

wherein x and y are selected from the group consisting of H, halogen, alkyl, and an alkali or alkaline earth metal ion and at least x or y is H or a metal ion.

2. The method of stabilizing an active efficient halogen source claimed in claim 1, further comprising:

forming an aqueous solution of said active efficient halogen source;

mixing said aqueous solution with said sulfonamide; and adding said hydratable detergent builders to said solution.

3. The method of claim 2 wherein said efficient halogen source is a source of chlorine.

4. The method of claim 1 wherein said sulfonamide is selected from the group consisting of p-toluene sulfonamide and N-sodium-N-chloro-p-toluene sulfonamide.

5. A stabilized active halogen composition formed by mixing a sulfonamide selected from the group consisting of water soluble alkyl sulfonamides, water soluble aryl sulfonamides and water soluble alkylaryl sulfonamides, an active halogen source, and selected from the group consisting of water soluble hypochlorites, halogenated hydantoins, halogenated phosphates, chlorinated isocyanuric acids and salts thereof, free water to form a solution of said sulfonamide and said halogen source and further adding at least one hydratable detergent builder in at least an amount effective to form a solid wherein said sulfonamide includes a sulfonamide radical defined by the following formula:

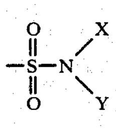

wherein x and y are selected from the group consisting of H, alkyl, halogen and an alkali or alkaline earth metal ion and wherein x and y is H or a metal ion.

6. The composition of claim 5 wherein said sulfonamide is selected from the group consisting of p-toluene sulfonamide and N-sodium-N-chloro-p-toluene sulfonamide.

7. The composition claimed in claim 5 wherein the molar ratio of sulfonamide to halogen source is at least about 0.5 when both x and y are either H or an alkali or alkaline earth metal ion and at least about 1 when only x is H or a metal ion.

8. The composition claimed in claim 7 comprising approximately 0.5 to 7% sulfonamide selected from the group consisting of p-toluene sulfonamide and N-sodium-N-chloro-p-toluene sulfonamide, 0.4 to 2.5% hypochlorite, 25 to 65% water, 5 to 40% anhydrous phosphate, 0 to 25% anhydrous silicate, 0 to 10% polyelectrolyte, 0 to 35% sodium carbonate, and 0 to 5% defoamer.

9. The composition of claim 8 further comprising up to 40% metal hydroxide.

* * * * *

UNITED STATES PATENT AND TRADEMARK OFFICE

CERTIFICATE OF CORRECTION

PATENT NO. : 4,681,696

DATED : July 21, 1987

INVENTOR(S) : Anthony J. Bruegge et al

It is certified that error appears in the above-identified patent and that said Letters Patent is hereby corrected as shown below:

Column 1, line 13, "$Br^{30}$" should be --$Br^{+}$--.

Column 2, line 18, "self" should be --shelf--.

Column 3, line 4, "methylenebis" should be --methylene-bis--.

Column 8, line 34, "detrgent" should be --detergent--.

Column 8, line 40, "sabilization" should be --stabilization".

Column 8, line 60, "whch" should be --which--.

Column 9, line 3, "($\frac{Gx}{100}$ Re-Rd)" should be --$\frac{Gx}{100}$ (Re-Rd)--.

Signed and Sealed this

Tenth Day of November, 1987

*Attest:*

DONALD J. QUIGG

*Attesting Officer*

*Commissioner of Patents and Trademarks*